United States Patent
Mula et al.

(10) Patent No.: US 11,588,609 B2
(45) Date of Patent: Feb. 21, 2023

(54) HARDWARE CLOCK WITH BUILT-IN ACCURACY CHECK

(71) Applicant: MELLANOX TECHNOLOGIES, LTD., Yokneam (IL)

(72) Inventors: Liron Mula, Ramat Gan (IL); Dotan David Levi, Kiryat Motzkin (IL); Ariel Almog, Kohav Yair (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/148,605

(22) Filed: Jan. 14, 2021

(65) Prior Publication Data

US 2022/0224500 A1    Jul. 14, 2022

(51) Int. Cl.
*H04W 40/20* (2009.01)
*H04L 7/00* (2006.01)

(52) U.S. Cl.
CPC .................. *H04L 7/0012* (2013.01)

(58) Field of Classification Search
CPC ..... H04L 1/0061; H04L 12/403; H04W 84/18
See application file for complete search history.

(56) References Cited

U.S. PATENT DOCUMENTS

| | | |
|---|---|---|
| 5,392,421 A | 2/1995 | Lennartsson |
| 5,402,394 A | 3/1995 | Turski |
| 5,416,808 A | 5/1995 | Witsaman et al. |
| 5,491,792 A | 2/1996 | Grisham et al. |
| 5,564,285 A | 10/1996 | Jurewicz et al. |
| 5,592,486 A | 1/1997 | Lo et al. |
| 5,896,524 A | 4/1999 | Halstead, Jr. et al. |
| 6,055,246 A | 4/2000 | Jones |
| 6,084,856 A | 7/2000 | Simmons et al. |
| 6,144,714 A | 11/2000 | Bleiweiss et al. |
| 6,199,169 B1 | 3/2001 | Voth |
| 6,289,023 B1 | 9/2001 | Dowling et al. |
| 6,449,291 B1 | 9/2002 | Burns et al. |
| 6,535,926 B1 | 3/2003 | Esker |

(Continued)

FOREIGN PATENT DOCUMENTS

| | | |
|---|---|---|
| CN | 106817183 A | 6/2017 |
| CN | 108829493 A | 11/2018 |

(Continued)

OTHER PUBLICATIONS

IEEE Std 1588-2002, "IEEE Standard for a Precision Clock Synchronization Protocol for Networked Measurement and Control Systems", IEEE Instrumentation and Measurement Society, pp. 1-154, Nov. 8, 2002.

(Continued)

*Primary Examiner* — Jamal Javaid
(74) *Attorney, Agent, or Firm* — Kligler & Associates Patent Attorneys Ltd

(57) ABSTRACT

A network device includes one or more ports for connecting to a communication network, packet processing circuitry and clock circuitry. The packet processing circuitry is configured to communicate packets over the communication network via the ports. The clock circuitry includes a hardware clock configured to indicate a network time used for synchronizing network devices in the communication network, and a built-in accuracy test circuit configured to check an accuracy of the hardware clock.

21 Claims, 1 Drawing Sheet

(56) References Cited

U.S. PATENT DOCUMENTS

| | | |
|---|---|---|
| 6,556,638 B1 | 4/2003 | Blackburn |
| 6,718,476 B1 | 4/2004 | Shima |
| 6,918,049 B2 | 7/2005 | Lamb et al. |
| 7,111,184 B2 | 9/2006 | Thomas, Jr. et al. |
| 7,191,354 B2 | 3/2007 | Purho |
| 7,245,627 B2 | 7/2007 | Goldenberg et al. |
| 7,254,646 B2 | 8/2007 | Aguilera et al. |
| 7,334,124 B2 | 2/2008 | Pham et al. |
| 7,412,475 B1 | 8/2008 | Govindarajalu |
| 7,440,474 B1 | 10/2008 | Goldman et al. |
| 7,447,975 B2 | 11/2008 | Riley |
| 7,483,448 B2 | 1/2009 | Bhandari et al. |
| 7,496,686 B2 | 2/2009 | Coyle |
| 7,535,933 B2 | 5/2009 | Zerbe et al. |
| 7,623,552 B2 | 11/2009 | Jordan et al. |
| 7,636,767 B2 | 12/2009 | Lev-Ran et al. |
| 7,650,158 B2 | 1/2010 | Indirabhai |
| 7,656,751 B2 | 2/2010 | Rischar et al. |
| 7,750,685 B1 | 7/2010 | Bunch et al. |
| 7,904,713 B1 | 3/2011 | Zajkowski et al. |
| 7,941,684 B2 | 5/2011 | Serebrin et al. |
| 8,065,052 B2 | 11/2011 | Fredriksson et al. |
| 8,341,454 B1 | 12/2012 | Kondapalli |
| 8,370,675 B2 | 2/2013 | Kagan |
| 8,407,478 B2 | 3/2013 | Kagan et al. |
| 8,607,086 B2 | 12/2013 | Cullimore |
| 8,699,406 B1 | 4/2014 | Charles et al. |
| 8,879,552 B2 | 11/2014 | Zheng |
| 8,930,647 B1 | 1/2015 | Smith |
| 9,344,265 B2 | 5/2016 | Karnes |
| 9,397,960 B2 | 7/2016 | Arad et al. |
| 9,549,234 B1 | 1/2017 | Mascitto |
| 9,979,998 B1 | 5/2018 | Pogue et al. |
| 10,014,937 B1 | 7/2018 | Di Mola et al. |
| 10,027,601 B2 | 7/2018 | Narkis et al. |
| 10,054,977 B2 | 8/2018 | Mikhaylov et al. |
| 10,164,759 B1 | 12/2018 | Volpe |
| 10,320,646 B2 | 6/2019 | Mirsky et al. |
| 10,637,776 B2 | 4/2020 | Iwasaki |
| 10,727,966 B1 | 7/2020 | Izenberg et al. |
| 2001/0006500 A1* | 7/2001 | Nakajima .......... G11B 20/1403 369/47.35 |
| 2002/0027886 A1 | 3/2002 | Fischer et al. |
| 2002/0031199 A1 | 3/2002 | Rolston et al. |
| 2004/0096013 A1 | 5/2004 | Laturell et al. |
| 2004/0153907 A1 | 8/2004 | Gibart |
| 2005/0033947 A1 | 2/2005 | Morris et al. |
| 2005/0268183 A1 | 12/2005 | Barmettler |
| 2006/0109376 A1 | 5/2006 | Chaffee et al. |
| 2007/0008044 A1 | 1/2007 | Shimamoto |
| 2007/0072451 A1 | 3/2007 | Tazawa et al. |
| 2007/0104098 A1 | 5/2007 | Kimura et al. |
| 2007/0124415 A1 | 5/2007 | Lev-Ran et al. |
| 2007/0139085 A1 | 6/2007 | Elliot et al. |
| 2007/0159924 A1* | 7/2007 | Vook .................. G08B 13/1672 367/127 |
| 2007/0266119 A1* | 11/2007 | Ohly ..................... H04J 3/0664 709/220 |
| 2008/0069150 A1 | 3/2008 | Badt et al. |
| 2008/0285597 A1 | 11/2008 | Downey et al. |
| 2009/0257458 A1 | 10/2009 | Cui et al. |
| 2010/0280858 A1 | 11/2010 | Bugenhagen |
| 2011/0182191 A1 | 7/2011 | Jackson |
| 2012/0076319 A1 | 3/2012 | Terwal |
| 2013/0045014 A1 | 2/2013 | Mottahedin et al. |
| 2013/0215889 A1 | 8/2013 | Zheng et al. |
| 2013/0235889 A1 | 9/2013 | Aweya et al. |
| 2013/0294144 A1* | 11/2013 | Wang ............... G11C 29/56008 365/148 |
| 2013/0315265 A1 | 11/2013 | Webb, III et al. |
| 2013/0336435 A1 | 12/2013 | Akkihal et al. |
| 2014/0153680 A1 | 6/2014 | Garg et al. |
| 2014/0185632 A1 | 7/2014 | Steiner et al. |
| 2014/0253387 A1 | 9/2014 | Gunn et al. |
| 2014/0321285 A1 | 10/2014 | Chew et al. |
| 2015/0078405 A1 | 3/2015 | Roberts |
| 2015/0127978 A1 | 5/2015 | Cui et al. |
| 2015/0318941 A1 | 11/2015 | Zheng et al. |
| 2016/0072602 A1 | 3/2016 | Earl et al. |
| 2016/0110211 A1 | 4/2016 | Karnes |
| 2016/0277138 A1 | 9/2016 | Garg et al. |
| 2016/0315756 A1 | 10/2016 | Tenea et al. |
| 2017/0005903 A1 | 1/2017 | Mirsky |
| 2017/0214516 A1 | 7/2017 | Rivaud et al. |
| 2017/0302392 A1 | 10/2017 | Farra et al. |
| 2017/0331926 A1 | 11/2017 | Raveh et al. |
| 2017/0359137 A1 | 12/2017 | Butterworth et al. |
| 2018/0059167 A1 | 3/2018 | Sharf et al. |
| 2018/0152286 A1 | 5/2018 | Kemparaj et al. |
| 2018/0191802 A1 | 7/2018 | Yang et al. |
| 2018/0227067 A1 | 8/2018 | Hu et al. |
| 2018/0309654 A1 | 10/2018 | Achkir et al. |
| 2019/0007189 A1 | 1/2019 | Hossain et al. |
| 2019/0014526 A1* | 1/2019 | Bader ..................... H04L 69/22 |
| 2019/0089615 A1 | 3/2019 | Branscomb et al. |
| 2019/0149258 A1 | 5/2019 | Araki et al. |
| 2019/0158909 A1 | 5/2019 | Kulkarni et al. |
| 2019/0273571 A1 | 9/2019 | Bordogna et al. |
| 2019/0319729 A1 | 10/2019 | Leong et al. |
| 2019/0349392 A1 | 11/2019 | Wetterwald et al. |
| 2019/0379714 A1 | 12/2019 | Levi et al. |
| 2020/0162234 A1 | 5/2020 | Almog et al. |
| 2020/0169379 A1 | 5/2020 | Gaist et al. |
| 2020/0304224 A1 | 9/2020 | Neugeboren |
| 2020/0331480 A1 | 10/2020 | Zhang et al. |
| 2020/0344333 A1 | 10/2020 | Hawari et al. |
| 2020/0396050 A1 | 12/2020 | Perras et al. |
| 2020/0401434 A1 | 12/2020 | Thampi et al. |
| 2021/0218431 A1 | 7/2021 | Narayanan et al. |
| 2021/0297230 A1 | 9/2021 | Dror et al. |
| 2021/0318978 A1 | 10/2021 | Hsung |
| 2022/0066978 A1 | 3/2022 | Mishra et al. |

FOREIGN PATENT DOCUMENTS

| | | |
|---|---|---|
| EP | 1215559 B1 | 9/2007 |
| EP | 2770678 A1 | 8/2014 |
| JP | 2011091676 A | 5/2011 |
| WO | 2012007276 A1 | 1/2012 |
| WO | 2013124782 A2 | 8/2013 |
| WO | 2013143112 A1 | 10/2013 |
| WO | 2014029533 A1 | 2/2014 |
| WO | 2014138936 A1 | 9/2014 |

OTHER PUBLICATIONS

U.S. Appl. No. 16/683,309 Office Action dated Sep. 17, 2021.

U.S. Appl. No. 16/920,722 Office Action dated Aug. 12, 2021.

IEEE Standard 1588™—2008: "IEEE Standard for a Precision Clock Synchronization Protocol for Networked Measurement and Control Systems", IEEE Instrumentation and Measurement Society, Revision of IEEE Standard 1588-2002, USA, pp. 1-289, Jul. 24, 2008.

Weibel et al., "Implementation and Performance of Time Stamping Techniques", 2004 Conference on IEEE 1588, pp. 1-29, Sep. 28, 2004.

Working Draft Project American National Standard T10/1799-D, "Information Technology—SCSI Block Commands—3 (SBC-3)", pp. 1-220, Revision 19, May 29, 2009.

"Infiniband Architecture: Specification vol. 1", pp. 1-1727, Release 1.2.1, Infiniband Trade Association, Nov. 2007.

Mellanox Technologies, "Mellanox ConnectX IB: Dual-Port InfiniBand Adapter Cards with PCI Express 2.0", pp. 1-2, USA, year 2008.

Wikipedia—"Precision Time Protocol", pp. 1-8, Aug. 24, 2019.

Levi et al., U.S. Appl. No. 16/779,611, filed Feb. 2, 2020.

Weibel, H., "High Precision Clock Synchronization according to IEEE 1588 Implementation and Performance Issues", Zurich University of Applied Sciences, pp. 1-9, Jan. 17, 2005.

Lu et al., "A Fast CRC Update Implementation", Computer Engineering Laboratory, Electrical Engineering Department, pp. 113-120, Oct. 8, 2003.

(56) References Cited

OTHER PUBLICATIONS

Levi et al., U.S. Appl. No. 16/799,873, filed Feb. 25, 2020.
Dlugy-Hegwer et al., "Designing and Testing IEEE 1588 Timing Networks", Symmetricom, pp. 1-10, Jan. 2007.
Mellanox Technologies, "How to test 1PPS on Mellanox Adapters", pp. 1-6, Oct. 22, 2019 downloaded from https://community.mellanox.com/s/article/How-To-Test-1PPS-on-Mellanox-Adapters.
ITU-T recommendation, "G.8273.2/Y. 1368.2—Timing characteristics of telecom boundary clocks and telecom time slave clocks", pp. 1-50, Jan. 2017.
Texas Instruments, "LMK05318 Ultra-Low Jitter Network Synchronizer Clock With Two Frequency Domains," Product Folder, pp. 1-86, Dec. 2018.
Ravid et al., U.S. Appl. No. 16/920,772, filed Jul. 6, 2020.
Sela et al., U.S. Appl. No. 16/900,931, filed Jun. 14, 2020.
Levi et al., U.S. Appl. No. 17/120,313, filed Dec. 14, 2020.
Sattinger et al., U.S. Appl. No. 17/191,736, filed Mar. 4, 2021.
Levi et al., U.S. Appl. No. 17/067,690, filed Oct. 11, 2020.
Levi et al., U.S. Appl. No. 16/782,075, filed Feb. 5, 2020.
Levi et al., U.S. Appl. No. 16/921,993, filed Jul. 7, 2020.
Mula et al., U.S. Appl. No. 16/910,193, filed Jun. 24, 2020.
IPCLOCK, "IEEE 1588 Primer," ip-clock.com, pp. 1-3, May 1, 2017 (downloaded from https://web.archive.org/web/20170501192647/http://ip-clock.com/ieee-1588-primer/).
U.S. Appl. No. 16/900,931 Office Action dated Apr. 28, 2022.
U.S. Appl. No. 16/683,309 Office Action dated Mar. 17, 2022.
U.S. Appl. No. 16/779,611 Office Action dated Mar. 17, 2022.
U.S. Appl. No. 17/120,313 Office Action dated Mar. 28, 2022.
U.S. Appl. No. 17/191,736 Office Action dated Apr. 26, 2022.
EP Application # 21214269 Search Report dated May 2, 2022.
EP Application #22151451.6 Search Report dated Jun. 17, 2022.
U.S. Appl. No. 16/779,611 Office Action dated Jun. 24, 2022.
U.S. Appl. No. 17/120,313 Office Action dated Aug. 29, 2022.
ITU-T Standard G.8262/Y.1362, "Timing characteristics of synchronous equipment slave clock", pp. 1-44, Nov. 2018.
ITU-T Standard G.8264/Y.1364, "Distribution of timing information through packet networks", pp. 1-42, Aug. 2017.
"Precision Time Protocol," PTP Clock Types, CISCO, pp. 1-52, Jul. 30, 2020, as downloaded from https://www.cisco.com/c/en/us/td/docs/dcn/aci/apic/5x/system-management-configuration/cisco-apic-system-management-configuration-guide-52x/m-precision-time-protocol.pdf.
ITU-T Standard G.8261/Y.1361, "Timing and synchronization aspects in packet networks", pp. 1-120, Aug. 2019.
U.S. Appl. No. 17/579,630 Office Action dated Oct. 24, 2022.
U.S. Appl. No. 17/191,736 Office Action dated Nov. 10, 2022.
U.S. Appl. No. 17/579,630 Office Action dated Jan. 12, 2023.
U.S. Appl. No. 17/670,540 Office Action dated Jan. 18, 2023.

* cited by examiner

HARDWARE CLOCK WITH BUILT-IN ACCURACY CHECK

FIELD OF THE INVENTION

The present invention relates generally to network devices, and particularly to built-in accuracy checking for hardware clocks in network devices.

BACKGROUND OF THE INVENTION

Computer and communication networks may use various schemes and protocols for synchronizing network nodes to a common time-base. One common example of such a protocol is the Precision Time Protocol (PTP) defined in IEEE standard 1588-2002, and later versions thereof. PTP is used to synchronize clocks throughout a computer network and may achieve sub-microsecond accuracy.

U.S. Pat. No. 8,370,675 describes techniques for precise clock synchronization, e.g., in a network node. In some embodiments, an apparatus includes a real-time clock circuit, which is configured to output a local clock time, and which comprises a register, which is coupled to receive an offset value, and an adder, which is coupled to sum the local clock time with the offset value in the register so as to give an adjusted value of the local clock time, and a host processor configured to compute the offset value between the local clock time and a reference clock time, and to load the offset value into the register.

U.S. Patent Application Publication 2016/0315756 describes a system for testing recovered clock quality and includes a test device for operating as a timing synchronization protocol master for communicating with a device under test functioning as a timing synchronization protocol slave or a timing synchronization protocol boundary clock to synchronize a clock of the device under test with a clock of the test device.

SUMMARY OF THE INVENTION

An embodiment of the present invention that is described herein provides a network device including one or more ports for connecting to a communication network, packet processing circuitry and clock circuitry. The packet processing circuitry is configured to communicate packets over the communication network via the ports. The clock circuitry includes a hardware clock configured to indicate a network time used for synchronizing network devices in the communication network, and a built-in accuracy test circuit configured to check an accuracy of the hardware clock.

In some embodiments, the hardware clock is configured to track the network time in accordance with a Precision Time Protocol (PTP). In some embodiments, the built-in accuracy test circuit is configured to receive an external reference signal from outside the network device, and to sample the network time output from the hardware clock at a timing derived from the external reference signal.

In an example embodiment, the built-in accuracy test circuit is configured to transmit the sampled network time from the network device. Additionally or alternatively, the built-in accuracy test circuit may be configured to provide the sampled network time to a controller in the network device. In a disclosed embodiment, the external reference signal includes a pulse-per-second (PPS) signal. In some embodiments, the accuracy of the hardware clock is indicated by a deviation between the sampled network time and the external reference signal.

In a disclosed embodiment, the external reference signal includes a dedicated test signal, which differs from a pulse-per-second (PPS) signal and which comprises a predefined pattern, and the built-in accuracy test circuit is configured to identify the dedicated test signal and to sample the network time at the timing derived from the predefined pattern. In an embodiment, the external reference signal includes a 10 MHz signal. In an embodiment, the hardware clock is configured to indicate the network time on a parallel output interface, and the built-in accuracy test circuit includes a set of Flip-Flops (FFs) that are configured to sample the parallel output interface at the timing derived from the external reference signal.

There is additionally provided, in accordance with an embodiment of the present invention, a method including, in a network device, communicating packets over a communication network. A network time, used for synchronizing network devices in the communication network, is indicated using a hardware clock in the network device. An accuracy of the hardware clock is checked using a built-in accuracy test circuit in the network device.

The present invention will be more fully understood from the following detailed description of the embodiments thereof, taken together with the drawings in which:

DETAILED DESCRIPTION OF EMBODIMENTS

Overview

Embodiments of the present invention that are described herein provide techniques for built-in accuracy testing of hardware clocks in network devices. The disclosed techniques are useful, for example, for testing the accuracy of PTP Hardware Clocks (PHCs) that are integrated into network adapters and network switches.

In some embodiments, a network device is configured to communicate packets over a communication network. Among other components, the network device comprises a hardware clock that is configured to track and indicate the network time used for synchronizing network devices in the communication network. The network device further comprises a built-in accuracy test circuit, which is configured to check the accuracy of the hardware clock.

Typically, the built-in accuracy test circuit tests the accuracy of the hardware clock relative to an external reference signal, e.g., a Pulse-Per-Second (PPS) signal, which is received from outside the network device. In an embodiment, the hardware clock outputs a digital word indicative of the current network time, and the built-in accuracy test circuit samples this digital word at a timing that is derived from the external reference signal. When using a PPS signal, for example, the built-in accuracy test circuit may sample ("take a snapshot of") the digital word produced by the hardware clock on the rising or falling edge of the PPS signal.

The sampled network time is thus indicative of the estimated network time, as tracked and indicated by the hardware clock at the time-of-arrival of the external signal in the network device. When the external reference signal is derived from some standard time-base, e.g., from a grandmaster clock of the network, the sampled network time is indicative of the accuracy of the hardware clock relative to this standard time-base.

In various embodiments, the built-in accuracy test circuit may act upon the sampled network time in various way, e.g., send the sampled network time to various destinations for processing. The process of sampling and reporting may be performed, for example, periodically, in response to certain events, or on demand.

The disclosed techniques provide scalable and cost-effective means for testing the accuracy of hardware clocks in network devices. It may be possible in principle to sample the output of a hardware clock and test its accuracy using commercial test equipment. Such a measurement, however, is unsuitable for anything more than sporadic measurements on a small number of network devices. The disclosed techniques, in contrast, can be applied on an on-going basis to a large number of network devices, e.g., to an entire data center, without requiring any external test equipment.

System Description

Figure 1:
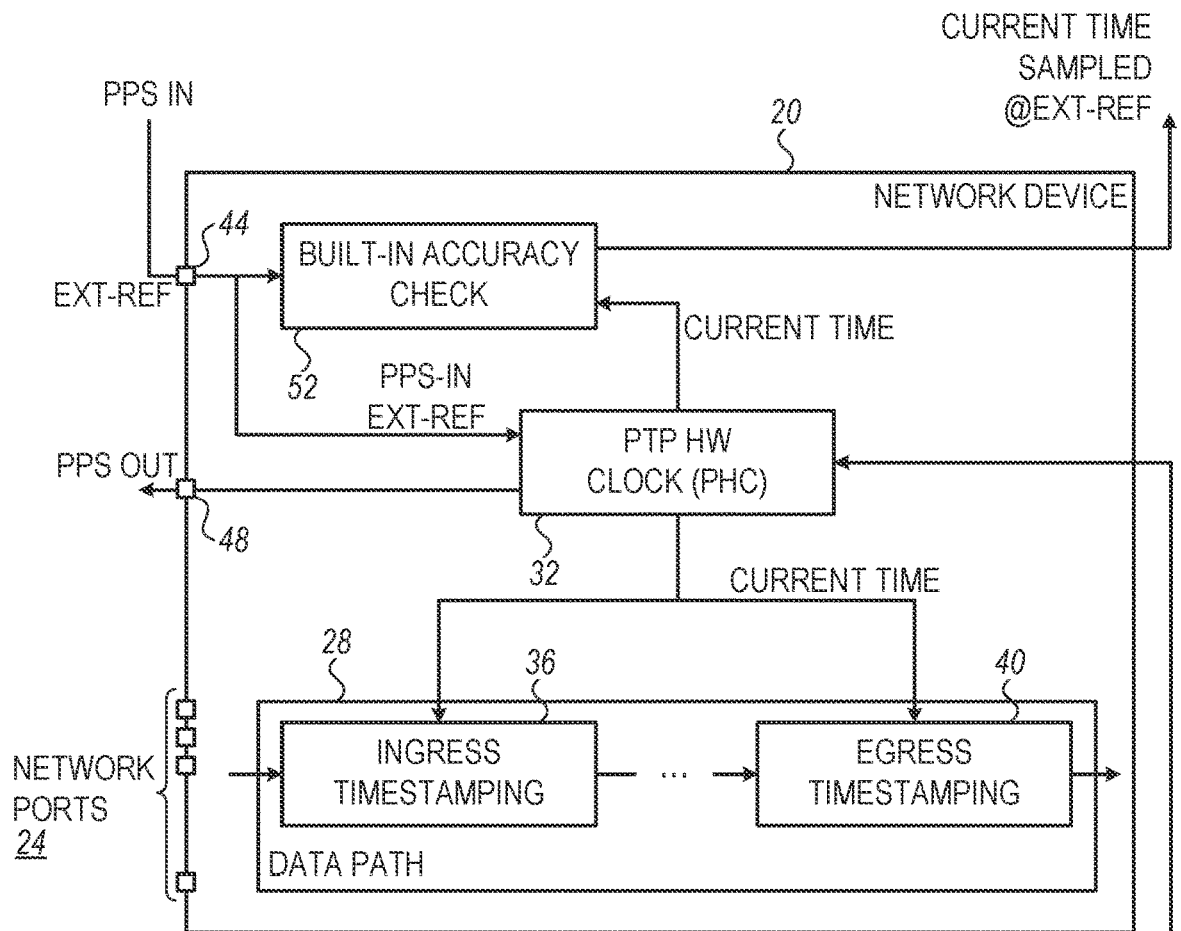
FIG. 1 is a block diagram that schematically illustrates a network device employing built-in hardware-clock accuracy checking, in accordance with an embodiment of the present invention.

FIG. 1 is a block diagram that schematically illustrates a network device 20 employing built-in hardware-clock accuracy checking, in accordance with an embodiment of the present invention. Network device 20 may comprise, for example, a network adapter such as an Ethernet Network Interface Controller (NIC) or an Infiniband™ Host Channel Adapter (HCA), a network switch or router, a network-enabled Graphics Processing Unit (GPU), or any other suitable type of device capable of network communication.

Network device 20 comprises one or more network ports 24, for receiving packets from a network (not shown) and for transmitting packets to the network. The network may comprise, for example, an Ethernet or Infiniband network, or any other suitable network type.

Network device 20 further comprises packet processing circuitry for communicating (transmitting and receiving) packets over the network via ports 24. In the present example the packet processing circuitry comprises a data path 28. Data path 28 receives packets from the network via ports 24, processes the packets, and sends the packets to the network via the ports. This sort of data path, which is more typical of a switch or router, is depicted by way of example. In a network adapter, for example, the data path may receive packets from a host and send the packets to the network, and vice versa. Further alternatively, any other suitable packet processing circuitry, having any other suitable functionality, can be used.

Network device 20 further comprises a hardware clock, in the present example a PTP Hardware Clock (PHC) 32. PHC 32 is configured to track the current network time, i.e., the common time-base used for synchronizing the various network devices in the network. To assist accurate tracking, PHC 32 may be adjusted ("disciplined") in various ways. In some embodiments, network device 20 comprises a PPS-IN input interface 44, for receiving a PPS input signal used for disciplining PHC 32. Additionally or alternatively, PHC 32 may receive adjustments from a local host over a suitable local interface (denoted "CLOCK ADJUSTMENTS" in the figure).

Typically, PHC 32 outputs a multi-bit digital word (denoted "CURRENT TIME" in the figure) that is indicative, at any given time, of the current network time as tracked by the PHC. In some embodiments, PHC 32 also produces a PPS output signal, which may be output from the network device via a PPS-OUT interface 48.

The current time output ("CURRENT TIME") can be used for various purposes in network device 20. For example, to support PTP, data path 28 may comprise ingress timestamping circuitry 36 and egress timestamping circuitry 40. Ingress timestamping circuitry 36 is configured to timestamp incoming PTP packets with the current time as they enter the network device, and egress timestamping circuitry 40 is configured to time-stamp outgoing PTP packets with the current time as they depart the network device.

As another example, data path 28, or network device 20 as a whole, may perform various packet processing operations that depend on the current time. Techniques of this sort are described, for example, in U.S. patent application Ser. No. 16/782,075, entitled "Network Adapter with Time-Aware Packet-Processing Pipeline," in U.S. patent application Ser. No. 16/910,193, entitled "Packet Scheduling System with Desired Physical Transmission Time for Packets," in U.S. patent application Ser. No. 16/921,993, entitled "TDMA Networking using Commodity NIC/Switch," and in U.S. patent application Ser. No. 17/067,690, entitled "Packet Transmission Using Scheduled Prefetching," whose disclosures are incorporated herein by reference.

Regardless of the specific usage of the network time in network device 20, it is highly desirable to assess the accuracy of PHC 32 in tracking and indicating the network time. For this purpose, network device 20 comprises a built-in accuracy check (test) circuit 52. The operation of circuit 52 will be described in detail further below. Briefly put, circuit 52 receives an external reference signal (denoted "EXT-REF") via PPS-IN interface 44. The external reference signal may comprise the same PPS input signal used for disciplining PHC 32, or a different signal, e.g., a dedicated signal used for accuracy testing. Circuit 52 samples the "CURRENT TIME" output of PHC 32 at a timing that is derived from the external reference signal. The sampled time (denoted "CURRENT TIME SAMPLED @EXT-REF" in the figure) is provided as output for analysis.

The configuration of network device 20 shown in FIG. 1 is an example configuration that is depicted purely for the sake of conceptual clarity. Any other suitable configuration can be used in alternative embodiments. The various elements of network device 20 may be implemented using suitable hardware, such as in one or more Application-Specific Integrated Circuits (ASIC) or Field-Programmable Gate Arrays (FPGA). The various elements of network device 20 may be implemented using hardware, using software, or using a combination of hardware and software elements.

Built-In PHC Accuracy Checking

Figure 2:
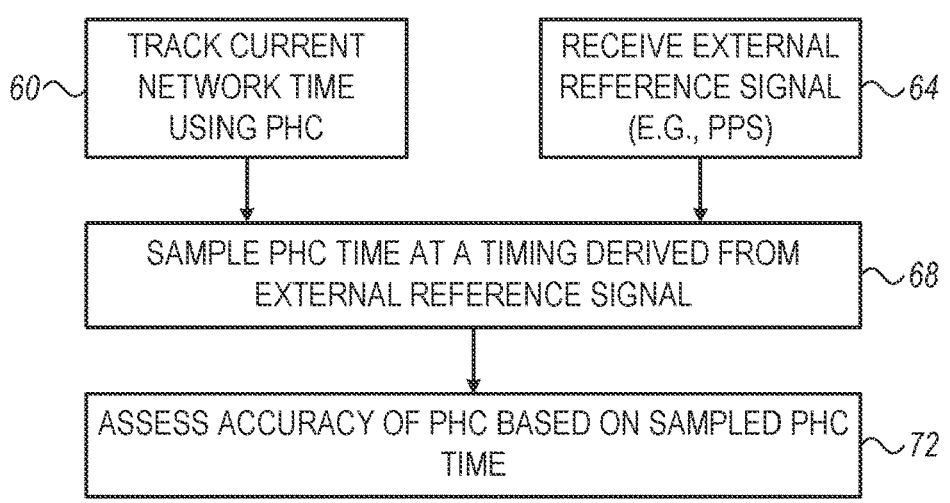
FIG. 2 is a flow chart that schematically illustrates a method for built-in hardware-clock accuracy checking, in accordance with an embodiment of the present invention.

FIG. 2 is a flow chart that schematically illustrates a method for built-in hardware-clock accuracy checking in network device 20, in accordance with an embodiment of the present invention. The method begins with PHC 32 tracking the network time, at a tracking step 60. At a reference input step 64, built-in accuracy test circuit 52 receives an external reference signal ("EXT-REF") via PPS-IN interface 44. At a sampling step 68, circuit 52 samples the "CURRENT TIME" output of PHC 32 at a timing that is derived from the external reference signal.

In some embodiments, the external reference signal comprises a PPS signal (e.g., a PPS input signal used for disciplining PHC 32, or another PPS signal). In other embodiments, the external reference signal comprises a dedicated test signal, which differs from a conventional PPS signal and is intended for accuracy checking of PHC 32.

For example, the external test signal may comprise a predefined pattern of rising and/or falling edges, e.g., three successive edges, whose timing is derived from the actual network time. Circuit 52 may monitor the PPS-IN input interface 44, detect the dedicated test signal, and sample the PHC output at a timing defined by the predefined pattern of edges. The external reference signal may have any suitable frequency—In one embodiment the signal is a 10 MHz signal.

In one non-limiting embodiment, PHC 32 has a parallel output interface, which outputs the current network time and is always valid for readout by clients. Test circuit 52 may comprise, for example, a set of Flip-Flops (FFs) that, when triggered by the external reference signal, sample the parallel output interface of PHC 32. In this context, circuit 52 may be regarded as an additional client of the PHC. In alternative embodiments, any other suitable configuration can be used.

The accuracy of PHC 32 is assessed, at an accuracy estimation step 72. In some embodiments, the accuracy of PHC 32 is estimated within network device 20. For example, when network device 20 is a network switch, circuit 52 may send the sampled network time to a controller of the network switch, which runs software that estimates the PHC accuracy.

In other embodiments, circuit 52 may send the sampled network time to a destination that is external to network device 20. Such a destination may comprise, for example, an analyzer or other suitable collector node. When network device 20 is a network switch, for example, circuit 52 may send the sampled network time over the network, e.g., in a communication packet, or output the sampled network time over a local output interface. When network device 20 is a network adapter, for example, circuit 52 may send the sampled network time to a local host, e.g., a compute node in which the network adapter is installed. Further additionally or alternatively, the sampled network time may be sent for analysis to any other suitable destination, or multiple destinations.

Assuming the external reference signal tracks the actual network time with high accuracy, the sampled time produced by circuit 52 is indicative of the accuracy of PHC 32 in tracking the network time.

In various embodiments, the sampled network time ("CURRENT TIME SAMPLED @EXT-REF") produced by circuit 52 can be used in various ways to estimate the deviation between the network time indicated by PHC 32 and the actual network time. In the present context, the term "deviation between the network time indicated by PHC 32 and the actual network time" may refer to a single, absolute difference between the network time indicated by PHC 32 and the actual network time, to some statistical measure of the difference between the network time indicated by PHC 32 and the actual network time, or to any other suitable form of deviation.

In some embodiments, the accuracy of PHC 32 is estimated based on a single measurement of circuit 52, i.e., based on a single sampled network time. Multiple such measurements may be performed at different times. In other embodiments, the accuracy of PHC 32 is estimated based on multiple measurements, e.g., by averaging or applying any other suitable statistical calculation over multiple sampled network times.

For example, in some embodiments the sampling operation in circuit 52 has a constant delay relative to the external reference signal. In some embodiments the size of this constant delay is known. In these embodiments it is possible to deduce the absolute difference between the network time indicated by PHC 32 and the actual network time. In other embodiments the delay is constant but unknown. In these embodiments it is only possible to estimate statistical deviations (between the network time indicated by PHC 32 and the actual network time) over multiple measurements. For example, such measurements can be used for estimating the Root-Mean-Square (RMS) error or standard deviation of the network time indicated by the PHC, over some time interval. Further alternatively, the sampled network time ("CURRENT TIME SAMPLED @EXT-REF") can be used in any other suitable way to estimate any other suitable measure of the accuracy of PHC 32.

The accuracy-testing techniques described herein can be used in various systems and applications, e.g., in testing of multiple hardware clocks of multiple network devices in a data center, in telco systems, automotive and industrial networks, robotic factories, and many others.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network device, comprising:
   one or more ports for connecting to a communication network;
   packet processing circuitry configured to communicate packets over the communication network via the ports; and
   clock circuitry, comprising:
     a hardware clock configured to output a digital word indicative of a network time used for synchronizing the network device to one or more other network devices in the communication network; and
     a built-in accuracy test circuit configured to receive an external reference signal having a predefined pattern of rising and/or falling edges and sample the digital word, which is output by the hardware clock, at a timing that is derived from the external reference signal.

2. The network device according to claim 1, wherein the hardware clock is configured to track the network time in accordance with a Precision Time Protocol (PTP).

3. The network device according to claim 1, wherein the built-in accuracy test circuit is configured to transmit the sampled digital word output from the network device.

4. The network device according to claim 1, wherein the built-in accuracy test circuit is configured to provide the sampled digital word output to a controller in the network device.

5. The network device according to claim 1, wherein the external reference signal used by the built-in accuracy test circuit to derive the timing of the sampling of the digital word output comprises a pulse-per-second (PPS) signal.

6. The network device according to claim 1, wherein the accuracy of the hardware clock is indicated by a deviation between the sampled network time and the external reference signal.

7. The network device according to claim 1, wherein the external reference signal comprises a dedicated test signal, which differs from a pulse-per-second (PPS) signal and which comprises a predefined pattern, and wherein the built-in accuracy test circuit is configured to identify the dedicated test signal and to sample the network time at the timing derived from the predefined pattern.

8. The network device according to claim 1, wherein the external reference signal used by the built-in accuracy test circuit to derive the timing of the sampling of the digital word output comprises a 10 MHz signal.

9. The network device according to claim 1, wherein the hardware clock is configured to indicate the network time on a parallel output interface, and wherein the built-in accuracy test circuit comprises a set of Flip-Flops (FFs) that are configured to sample the parallel output interface at the timing derived from the external reference signal.

10. A method, comprising:
in a network device, communicating packets over a communication network;
indicating a network time, used for synchronizing network devices in the communication network, using a hardware clock which outputs a digital word indicative of the network time in the network device; and
checking an accuracy of the hardware clock using a built-in accuracy test circuit in the network device, wherein the built-in accuracy test circuit receives an external reference signal having a predefined pattern of rising and/or falling edges, and samples the digital word, which is output by the hardware clock, at a timing that is derived from the external reference signal.

11. The method according to claim 10, wherein indicating the network time comprises tracking the network time in accordance with a Precision Time Protocol (PTP).

12. The method according to claim 10, wherein checking the accuracy of the hardware clock further comprises transmitting the sampled digital word output from the network device.

13. The method according to claim 10, wherein checking the accuracy of the hardware clock further comprises providing the sampled digital word output to a controller in the network device.

14. The method according to claim 10, wherein the external reference signal used by the built-in accuracy test circuit to derive the timing of the sampling of the digital word output comprises a pulse-per-second (PPS) signal.

15. The method according to claim 10, wherein the accuracy of the hardware clock is indicated by a deviation between the sampled network time and the external reference signal.

16. The method according to claim 10, wherein the external reference signal comprises a dedicated test signal, which differs from a pulse-per-second (PPS) signal and which comprises a predefined pattern, and wherein sampling the network time comprises identifying the dedicated test signal and sampling the network time at the timing derived from the predefined pattern.

17. The method according to claim 10, wherein the external reference signal used by the built-in accuracy test circuit to derive the timing of the sampling of the digital word output comprises a 10 MHz signal.

18. The method according to claim 10, wherein indicating the network time comprises outputting the network time on a parallel output interface, and wherein sampling the network time comprises sampling the parallel output interface at the timing derived from the external reference signal using a set of Flip-Flops (FFs).

19. The network device according to claim 1, wherein the external reference signal tracks the actual network time with high accuracy.

20. The network device according to claim 5, wherein the hardware clock is configured to discipline its timing using the PPS signal, which is also used by the built-in accuracy test circuit to derive the timing of the sampling of the digital word output.

21. The network device according to claim 5, wherein the hardware clock is configured to discipline its timing using a discipline signal, different from the PPS signal used by the built-in accuracy test circuit to derive the timing of the sampling of the digital word output.

* * * * *